A. J. FURR & W. C. KNAUS.
Shaving-Mugs.
No. 144,667. Patented Nov. 18, 1873.
Fig. 1.
Fig. 2.
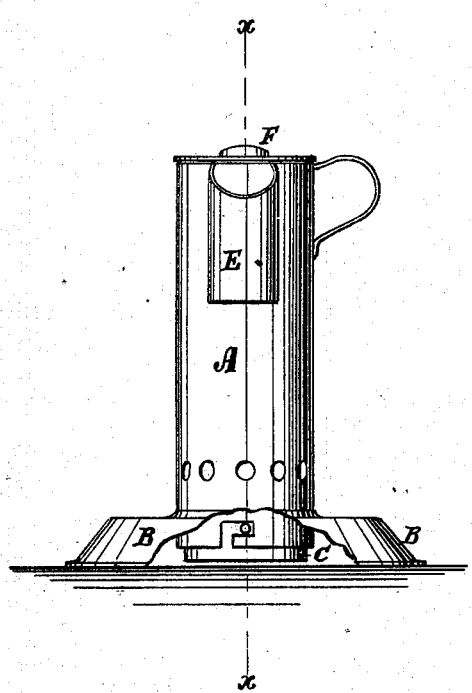
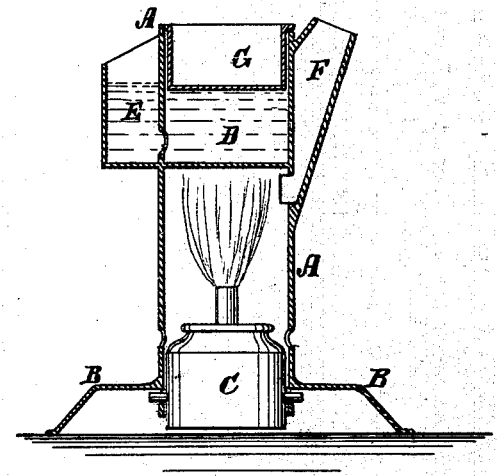
Witnesses:
Inventor:

UNITED STATES PATENT OFFICE.

ANDREW J. FURR AND WALTER C. KNAUS, OF BOONSBOROUGH, MO.

IMPROVEMENT IN SHAVING-MUGS.

Specification forming part of Letters Patent No. 144,667, dated November 18, 1873; application filed October 18, 1873.

*To all whom it may concern:*

Be it known that we, ANDREW J. FURR and WALTER C. KNAUS, of Boonsborough, in the county of Howard and State of Missouri, have invented a new and useful Improvement in Shaving-Cup, of which the following is a specification:

Figure 1 is a side view of our improved shaving-cup, part being broken away to show the construction. Fig. 2 is a vertical section of the same, taken through the line $x\ x$, Fig. 1.

Similar letters of reference indicate corresponding parts.

Our invention has for its object to furnish an improved shaving-cup, which shall be so constructed that the water may be warmed and kept warm by a small lamp connected with the cup itself, and which shall be simple in construction and convenient in use. The invention consists in the combination of the cylinder having a base attached to its lower end, a detachable lamp, a cup, a side cup, a side chimney or flue, and a soap-cup with each other, as hereinafter fully described.

A is a cylinder made of sheet metal, and provided at its lower end with a base, B. In the lower end of the cylinder A is fitted a small lamp, C, in which may be burned kerosene, alcohol, or other burning-fluid. To the opposite sides of the lamp C are attached pins, which enter bayonet-slots in the lower end of the cylinder A, so that the lamp can be conveniently attached and detached when desired. In the lower part of the cylinder A is formed a row of holes a little below the burner of the lamp C to allow the air to pass in freely to support combustion. In the upper part of the cylinder A is formed a cup or receptacle, D, to contain water. In the side of the cylinder A, a little above the bottom of the cup D, is formed a hole leading into a small chamber, E, attached to the side of the upper part of the cylinder A, and which should be of sufficient size to allow the shaving-brush to be inserted. In the other side of the upper part of the cylinder A, just below the bottom of the cup D, is formed a hole leading into the pipe F, attached to the side of the cylinder A, to serve as a chimney or flue to carry off the heated air and the gaseous products of combustion, and to form a draft to promote combustion. In the upper end of the cylinder A is fitted a small cup, G, in which the soap is placed, and in which the lather is made. The cup G has a flange formed around its upper edge to rest upon the upper edge of the cylinder A, and the said cup G should be such a depth as to extend down into the water in the cup D, so that the lather may be kept warm.

Having thus described our invention, we claim as new, and desire to secure by Letters Patent—

The combination of the cylinder A, base B, detachable lamp C, cup D, side cup E, side chimney or flue F, and detachable soap-cup G with each other, substantially as herein shown and described.

ANDREW J. FURR.
WALTER C. KNAUS.

Witnesses:
H. H. CROPP,
J. S. O'BRIAN.